(12) United States Patent
Pierce

(10) Patent No.: US 12,135,404 B2
(45) Date of Patent: *Nov. 5, 2024

(54) SNOW SENSORS AND METHODS FOR USE WITH SAME

(71) Applicant: CEM Products, LLC, Brentwood, TN (US)

(72) Inventor: Charles Edgar Pierce, Brentwood, TN (US)

(73) Assignee: CEM Products, LLC, Brentwood, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,965

(22) Filed: Jun. 9, 2023

(65) Prior Publication Data

US 2023/0314658 A1  Oct. 5, 2023

Related U.S. Application Data

(63) Continuation of application No. 17/735,009, filed on May 2, 2022, now Pat. No. 11,681,076, which is a continuation of application No. 17/347,308, filed on Jun. 14, 2021, now Pat. No. 11,320,567, which is a continuation of application No. 17/111,375, filed on Dec. 3, 2020, now Pat. No. 11,035,982.

(60) Provisional application No. 62/944,658, filed on Dec. 6, 2019.

(51) Int. Cl.
*G01W 1/14* (2006.01)

(52) U.S. Cl.
CPC ................................ *G01W 1/14* (2013.01)

(58) Field of Classification Search
CPC ...... G01W 1/14; G01N 15/06; G01N 15/0612; G01N 15/0806; G01N 2015/0846; G01N 2021/558; F21V 29/90; B60Q 1/0017; B60Q 1/00; F21S 43/14; F21S 43/145
See application file for complete search history.

(56) References Cited

U.S. PATENT DOCUMENTS

| 8,563,898 B1* | 10/2013 | Wright | B60Q 1/0017 |
| | | | 219/202 |
| 11,320,567 B2* | 5/2022 | Pierce | G01W 1/14 |
| 2007/0132599 A1* | 6/2007 | DuFaux | G01W 1/14 |
| | | | 702/3 |
| 2011/0311241 A1* | 12/2011 | Nagata | G03G 15/70 |
| | | | 399/21 |

* cited by examiner

*Primary Examiner* — John Fitzgerald
*Assistant Examiner* — Truong D Phan
(74) *Attorney, Agent, or Firm* — Laura Halburay Bishop

(57) ABSTRACT

Methods and assemblies for use with snow sensors and snow sensor mechanisms, such as snow removal systems, as well as component combinations and related methods.

10 Claims, 12 Drawing Sheets

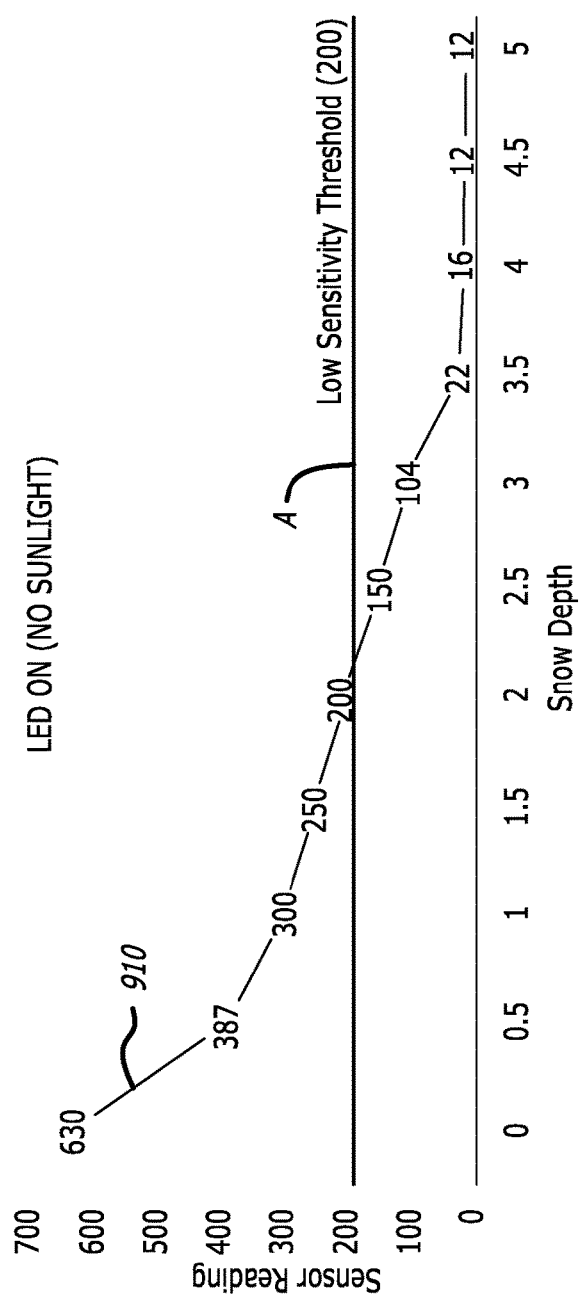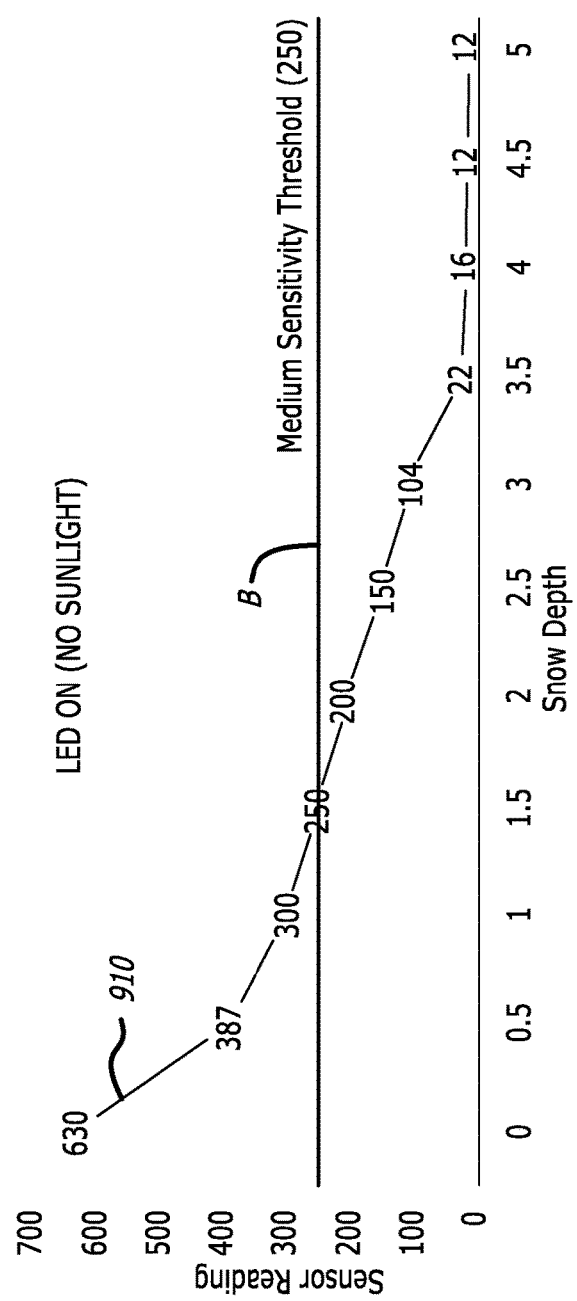

SNOW SENSORS AND METHODS FOR USE WITH SAME

CROSS-REFERENCE TO RELATED APPLICATION

This application is a continuation of U.S. application Ser. No. 17/735,009, filed May 2, 2022, now allowed and anticipated to issue as U.S. Pat. No. 11,681,076, which is a continuation of U.S. application Ser. No. 17/347,308, filed Jun. 14, 2021 and issued as U.S. Pat. No. 11,320,567, which is a continuation of U.S. application Ser. No. 17/111,375, filed Dec. 3, 2020 and issued as U.S. Pat. No. 11,035,982, which claims the benefit of and priority to U.S. Provisional Application Ser. No. 62/944,658, filed Dec. 6, 2019. These earlier applications are incorporated by reference in their entireties.

BACKGROUND

1. Field

The present devices and methods relate generally to snow sensors and use of those sensors.

2. Description of the Related Art

Snow, sleet, and ice gauges or sensors (referred to herein simply as "snow sensors") are devices that sense solid and semi-solid precipitation, including snow, sleet, ice, hail, graupel, and mixtures of solid and semi-solid precipitation (referred to herein simply as "snow"). Some snow sensors sense the presence of snow or other solid or semi-solid precipitation (referred to herein simply as "snowfall"). Other snow sensors, such as mechanical probes, provide measurements of the depth or quantity of snow. Some snow sensors provide information about some quality of snow, such as weight of snow, which may also indicate quantity or depth of snow, but in the case of weight, a depth determination based on weight will vary depending on the wetness and density of the snow.

One example of a gauge for measuring snow is a right circular cylinder, open at the top, which collects snow for instantaneous or later measurement. Sometimes, instead, a cylinder or other container may be heated or may include chemicals that melt the snow, where the weight of the resulting water is used to estimate a corresponding snow depth. In some instances, once a known weight of snow or melted snow has accumulated, the snow collector 'tips' to dispense the measured amount and begin collecting another amount to measure. Another variation uses a pair of thermal plates in a cylindrical housing. The first plate is positioned horizontally and collects snow while the second plate is positioned vertically under the first plate. The difference in current needed to maintain the two plates at the same temperature is used to estimate the precipitation amount and/or rate.

Other gauges sense an ultrasonic or other beam that bounces off the top of the accumulated snow. Examples of designs for these types of devices may be found at http://www.howmuchsnow.com/snow/. As described at this site, ultrasonic gauges are hard to focus, and to obtain an accurate reading from them, the readings must take temperature into account. Gauges that use an infrared light emitting diode (LED) and detect the bounced radiation have a small spot size and costs less than the ultrasonic device. The infrared LED is positioned beside a receiver in an assembly mounted parallel to, and facing, the surface to be measured. The intent is for the infrared radiation to bounce off the top of the snow and be sensed by the receiver, which focuses the reflected radiation onto a linear CCD array. The location of the reflected radiation on the receiver is dependent on the distance from the top of the accumulated snow to the receiver, purportedly providing a measurement of snow depth when compared to the known distance to the ground or other reference surface. In the example given on above website, the infrared triangulation measurement sensor used is the Sharp GP2D12, and the site includes the specification from Sharp showing their sensor outputs a non-linear analog voltage corresponding to the distance of the reflected object.

These gauges work on the theory that snow is opaque and will therefore bounce the radiation off top surface of the snow. However, more often than not, snow contains enough water that it is translucent. This will cause two problems. First, the radiation will reach a point below the snow surface before it will reflect—a point where the density of the snow is sufficient to reflect the radiation—and therefore provide an incorrect reading. This same problem may lead the gauge to not detect any snow until after enough has accumulated that the radiation is finally reflected. This is particularly problematic for systems that are dependent on accurately detecting the presence of snow. Second, when the radiation is reflected from below the actual snow surface, the reflected radiation may be diffuse and scattered. This diffuse radiation may not be detected by the receiver at all, or the receiver may have difficulty sensing where the diffuse radiation is striking the linear CCD array that translates to a distance and a resulting snow depth. As described at the above website, these gauges also require temperature and sunlight compensation. Finally, this system is limited by the height of the assembly containing the LEDs and receiver—if the snow is deep enough to reach or cover these components, it will be impossible for the system to report the snow depth.

Yet other gauges include a series of paired emitters and receivers. The receiver is positioned horizontally a known distance from its paired emitter. The first pair is positioned a known distance relatively close to the surface on which snow falls. The second pair is positioned a known distance from the surface, but further from the surface on which snow falls and spaced vertically from the first pair. The third pair is positioned a known, even further, distance from the surface on which snow falls and spaced vertically from the second pair. Additional pairs of emitters and receivers are similarly arranged further and further from the surface on which snow falls. As snow accumulates around and against the paired emitters and receivers, the pairs closest to the surface on which snow falls will, one after the next, be covered by snow. As the pairs of emitters and receivers are covered by snow, no, or at least less, radiation from the snow-covered emitters will reach their paired, snow-covered receiver. The snow depth will correspond to the distance from the surface on which snow falls to a space between the topmost sensor/receiver pair that is covered (and providing a small or undetectable reading) and the bottommost sensor/receiver pair that is not covered with snow (and therefore providing a strong reading). An alternative to this arrangement uses temperature sensors arranged in series rather than paired emitters and receivers. These are bulky and expensive gauges.

Variations on the above examples also exist. For instance, some systems include an optical disdrometer, images or other method to take the size/diameter of flakes/drops into account. As another example, some assemblies use a global positioning system to take measurements of the ground surface and then the snow surface, and then compare the measurements to establish the depth of snow.

Snow sensors have improved over the years. Nevertheless, the present inventor has determined that existing snow sensors are susceptible to a range of improvements. By way of example, but not limitation, the present inventor has determined that it would be desirable to provide a snow sensor that is simpler, that more reliably predicts the presence of snow, and is less costly than conventional snow sensors, while also being more compact and user-friendly than conventional snow sensors.

SUMMARY

A snow sensor includes a receiver; a window (if needed) on which snow can accumulate, positioned on top of the receiver; and one or more emitters positioned above and spaced apart from the receiver; where the one or more emitters emit radiation, and where any snow accumulated between the emitters and the receiver blocks at least some of the radiation from reaching the receiver, and where the receiver receives the remaining radiation and reports a numerical value that corresponds to the remaining radiation received by the receiver. The present inventions also include snow removal systems with such a snow sensor, snow removal system subassemblies, and related methods.

A snow removal system includes a snow melting component, a snow sensor, and a controller to control the snow melting component, where the snow sensor includes a receiver; a window (if needed), on which snow can accumulate, positioned on top of the receiver; and one or more emitters positioned above and spaced apart from the receiver; where the one or more emitters emit radiation, any snow accumulated between the emitters and the receiver blocks at least some of the radiation from reaching the receiver, the receiver receives the remaining radiation and reports a numerical value that corresponds to the remaining radiation received by the receiver, and the controller sends a command to the snow melting component according to the numerical value reported by the receiver.

A snow sensing method includes providing an artificial source of radiation and receiving radiation from that artificial source or a natural source or a combination of a natural source and the artificial source, and reporting a numerical value corresponding to the received radiation, particularly when snow is allowed to block the received radiation. A snow removal method may involve using this snow sensing method and further include providing a snow melting component, comparing the value reported by the snow sensing method to a threshold value, and controlling the snow melting component based on the comparison of the reported valued and the threshold value. Controlling the snow melting component may further include methods to activate the snow melting component manually or automatically.

BRIEF DESCRIPTION OF THE DRAWINGS

Detailed description of exemplary embodiments will be made with reference to the accompanying drawings.

FIG. 11A shows readings, under dark ambient conditions, from a receiver, as a function of snow depth, with a horizontal line depicting an example low-sensitivity threshold for dark conditions.

FIG. 11B shows readings, under dark ambient conditions, from a receiver, as a function of snow depth, with a horizontal line depicting an example medium-sensitivity threshold for dark conditions.

DETAILED DESCRIPTION

The following is a detailed description of the inventions. This description is not to be taken in a limiting sense, but is made merely for the purpose of illustrating the general principles of the inventions.

It should also be noted here that the specification describes structures and methods that are especially well-suited for use with a system or assembly that detects snow and initiates heating of a surface to prevent or remove snow accumulation. Nevertheless, it should be appreciated that the present inventions are applicable to a wide variety of systems. By way of example, but not limitation, the inventions may apply to a system that periodically reports an amount of accumulated snow.

Also note that the specification focuses on a snow sensor wired to other devices within an assembly and to a power source. But it should be appreciated that the present inventions are applicable to snow sensors that, for instance, contain a power source, such as a battery, so do not need to be hard-wired to a power source as described in more detail below. As another non-limiting example, the present inventions are also applicable to snow sensors that communicate with other system devices wirelessly. By way of example, but not limitation, the inventions may apply to snow sensors that communicate with other devices within the system via Bluetooth® or Wi-Fi™ technology, as described in more detail below.

The specification also describes use of a snow sensor that is used in a system that connects to a cloud server via the internet. Nonetheless, it should be appreciated that the present inventions are also applicable to other system connectivity. By way of example, but not limitation, the system could be connected to and controlled via a private server.

Figure 1A:
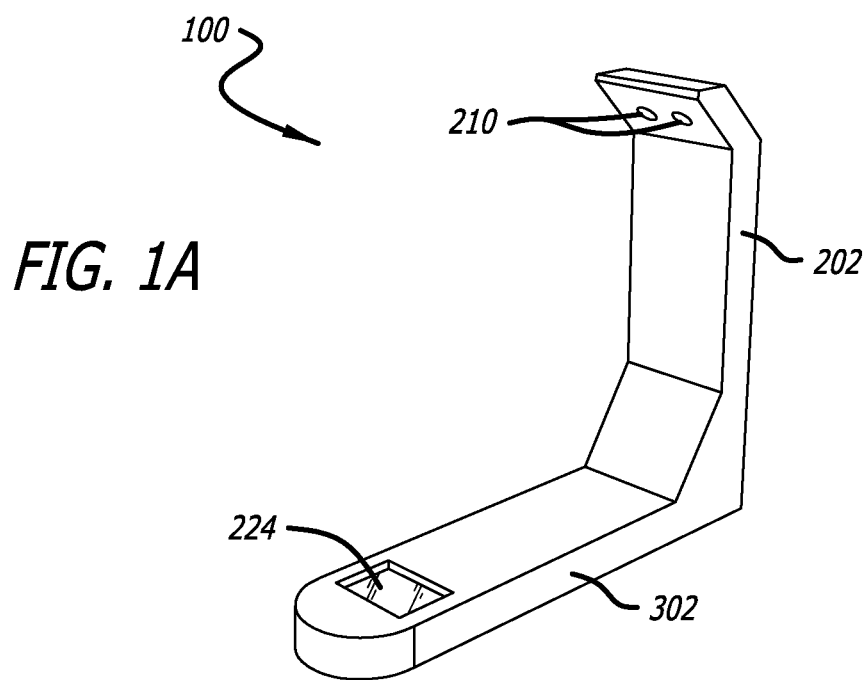
FIG. 1A is a perspective view of an exemplary snow sensor in an assembled state.
Figure 1B:
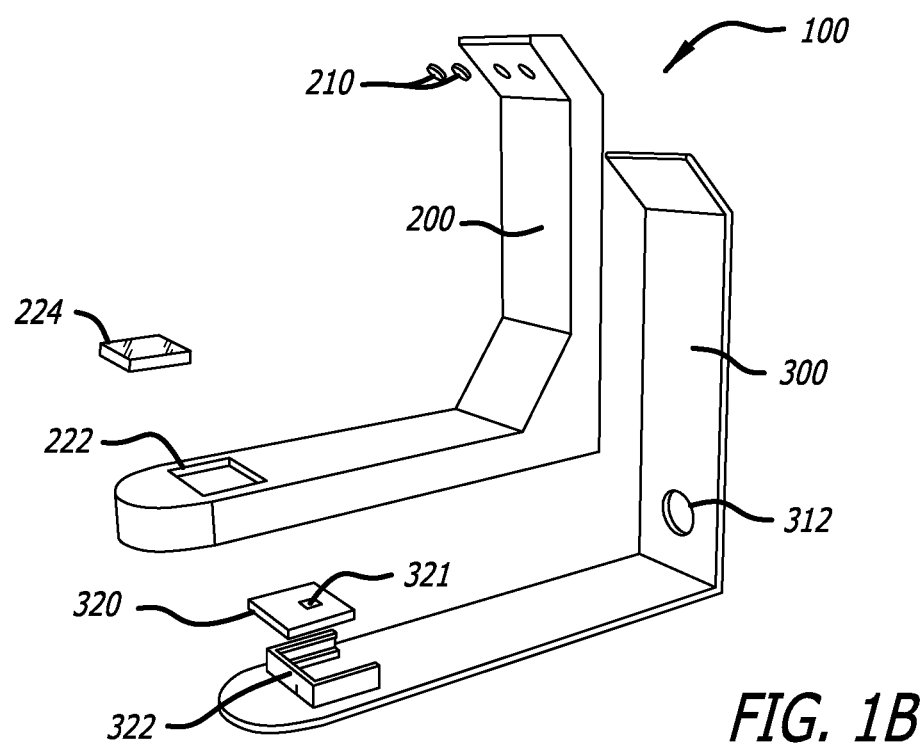
FIG. 1B is an exploded perspective view of certain components of the snow sensor illustrated in FIG. 1A, including a top and bottom of the sensor housing.
Figure 2:
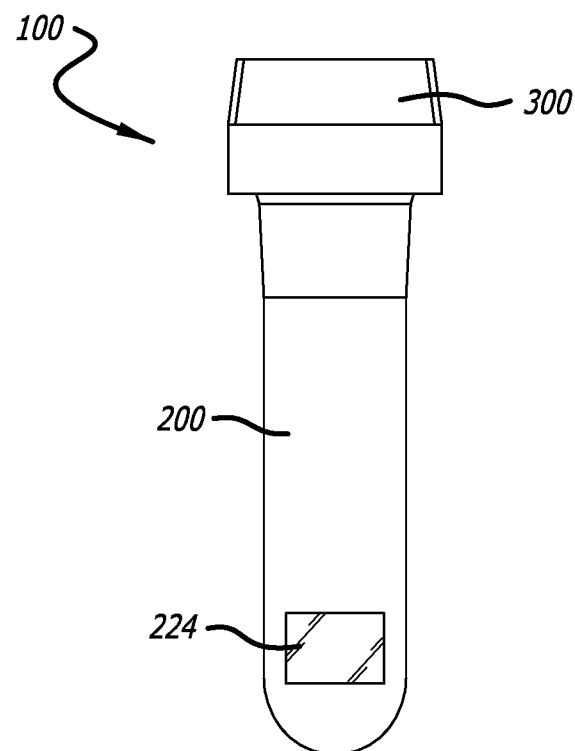
FIG. 2 is a top view of certain components of the snow sensor illustrated in FIGS. 1A and 1B.
Figure 3:
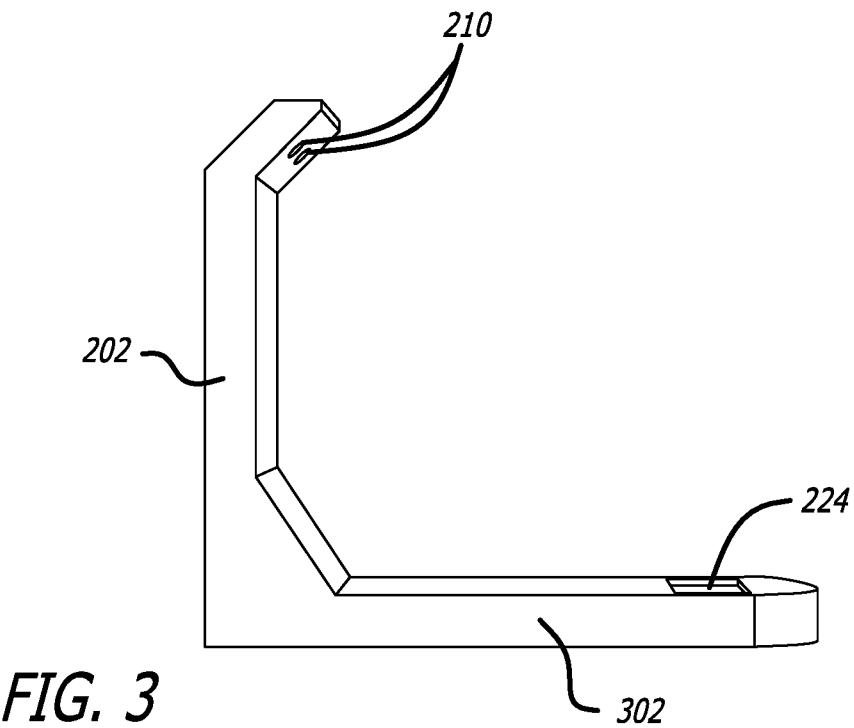
FIG. 3 is a side view of certain components of the snow sensor illustrated in FIGS. 1A and 1B.
Figure 4:
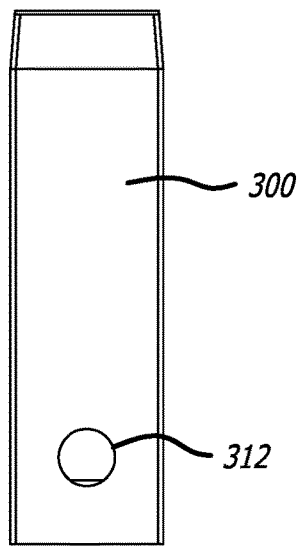
FIG. 4 is a view from the back of the snow sensor illustrated in FIGS. 1A and 1B.

An exemplary snow sensing device, which is generally represented by reference number 100 in FIGS. 1A and 1B, includes a housing top 200 and a housing bottom 300 that, together and as best seen in FIG. 3, form roughly an "L" shape with a housing base portion 302 and a housing post portion 202. Exemplary housing top 200, which is also shown in FIGS. 2 and 3, encloses one or more emitters, such as infrared (IR) emitters 210. The emitters 210 are positioned near the top of post portion 202, above a frame 222 in base portion 302 that holds an optical sensor window 224 that, in turn, sits atop an optical sensor board 320. Exemplary housing bottom 300 includes an electronics housing 322 to hold the optical sensor board 320. As best seen in FIGS. 1B and 4, housing bottom 300 also has an opening 312 for a wire(s) or connector(s) (not shown) to connect the snow sensing device (a.k.a., snow sensor) 100 to power, the internet, a local network, and/or other system components, such as a controller or a communications system. Alternatively and as mentioned above, snow sensor 100 may be powered internally with one or more batteries, such as lithium-ion batteries or alkaline batteries, and may include wireless technology, such as Bluetooth® or WiFi™ components, to communicate wirelessly with a cloud server over the internet or with one or more other system components (not shown), such as one or more switches, a control module (a.k.a. controller), a private server, a power source, etc. In yet other alternatives, one or more of these other system components may be included in the housing for snow sensor 100, such as a switch and controller.

Infrared emitters 210 may comprise IR light emitting diodes (LEDs) commercially available from Digi-Key Electronics, Arrow Electronics or other distributor of electronic components, such as superbright 5 mm IR LEDs running on 100 mA and emitting a 20 degree beamwidth at a wavelength of 940 nanometers. The emitters 210 may be placed on a board that may include other electronic components, such as, for example, resisters and/or other components to monitor emitters 210 to verify they are working and/or to protect emitters 210, e.g., in case of a voltage spike.

The type and number of IR emitters 210 may vary depending on the other snow sensor components used, particularly receiver chip 321, which is described further below. The type and number of emitters 210 is also dependent on the purpose for the snow sensor and the other system components used for the purpose, and on any limits placed on the space designated for the emitters 210 or any limits on the size of the housing portion containing the emitters 210. For instance, if snow sensor 100 is used in an assembly that detects snow and initiates heating of a surface to prevent or remove snow accumulation, the IR emitters 210 are preferably bright enough to provide a choice of sensitivity, as described further below, but not so bright that its radiation, combined with IR radiation from sunlight, overwhelms receiver 321 and defeats or reduces its ability to provide a legitimate or accurate reading. In addition, emitters 210 and sensor board 320 may be chosen to emit and sense other types of radiation. By way of examples and not limitation, other types of electromagnetic radiation may be emitted and sensed, such as visible light or ultraviolet radiation, or other types of radiation may be emitted and sensed, such as ultrasonic acoustic radiation.

Optical sensor board 320 may include a receiver chip 321 and related electronics. For instance, optical sensor board 320 may be a custom-made board that includes electronic components that are appropriate to the purposes of snow sensor 100 and that are needed to interface appropriately with receiver chip 321 and any other parts in the system using snow sensor 100. Receiver chip 321 may comprise an integrated circuit (IC) with integrated IR proximity detector commercially available from Digi-Key Electronics, Arrow Electronics or other distributor of electronic components, such as Vishay Semiconductor Opto Division's TSOP38238. Those of ordinary skill in the art will be aware of the additional electronic components necessary to interface with chip 321 and appropriate for their particular use and purpose of snow sensor 100. For instance, if snow sensor 100 is used in an assembly that detects snow and initiates heating of a surface to prevent or remove snow accumulation, the components may include a microcontroller and wiring to a switch that turns a heat tape on and off, resisters and capacitors to keep the chip 321 stable and protected from voltage spikes, etc., and may also include a communications chip for communicating with, e.g., a control module (a.k.a. controller). One or more of these additional electronic components may be separate, stand-alone components enclosed by housing top 200 and housing bottom 300, rather than placed on board 320. And as mentioned earlier, the housing for snow sensor 100 may also house a switch(es) and/or controller.

Depending on the use of snow sensor 100, optical sensor window 224 may be made of weather-proof or weather-resistant material transparent to the type of radiation emitted and sensed. In the case of IR emitters 210 and receiver chip 321, optical sensor window 224 may be glass, since any material that is not or does not remain IR-transparent may impact the sensitivity and/or effectiveness of snow sensor 100. In other alternatives, a separate window 224 may not be needed, as it may be integrated into receiver chip 321 or board 320. Housing top 200 and housing bottom 300 may be made from the same material or from compatible materials. For instance, they may both be made from ABS plastic or other weather resistant plastic.

Use of snow sensor 100 will now be addressed. For some uses of snow sensor 100, it is most important to know whether or not any snow has fallen. For other uses, it is also or instead more important to know how much snow has fallen, i.e., snow depth. In use, snow sensor 100 may be connected to other devices, as previously described, via wire or wirelessly. For instance, snow sensor 100 may be connected to a device that periodically reports a depth of snow. This device may receive readings from the sensor and translate those into values of snow depth. As another example, snow sensor 100 may be connected to a snow removal system, such as a system using heat tape or other snow melting component installed on or in the roof of a building, such as a home or hotel or other business, or on or in a walkway or driveway, or on piping. This system may include a controller to interpret readings from the sensor and act according to predetermined instructions or it may report the sensed data and wait for instructions in response. If snow sensor 100 is connected to such a snow removal system, it may be more important to know that any snow has or is falling, so the snow removal system may be automatically or manually activated.

Therefore, in some embodiments, snow sensor 100 reports or provides a number that corresponds to the amount of radiation that is sensed by receiver 321—this value varies (drops) as snow falls and accumulates on snow sensor 100 and it also varies (increases) as snow melts and/or is evaporated off of snow sensor 100. As further examples, snow removal may occur from any one of, or combinations of, the following: snow melting and/or evaporating from the heat of the sun, outside temperature, or some other natural method; snow melting and/or evaporating from a source such as the heat from a heated electrical wire (such as a heat tape system), heat from a roof radiated from inside a building, or any other artificial heating source; physical/mechanical snow removal such as from the wind, or naturally falling off of a roof due to the weight of the snow and the pitch of the roof, or any other naturally occurring method; physical/mechanical snow removal with a snow rake, shovel, leaf blower, or any other artificial method. The snow removal discussed herein may occur mainly to snow melting components discussed herein, but may be aided by one or more of these other snow removal methods or mechanisms. Similarly, the IR or other radiation that is sensed by receiver 321 or other receiver may be naturally occurring radiation, such as from the sun, or from an artificial source, such as IR emitters or other artificial source of IR or other radiation.

Returning to the example of snow sensor 100 including a first exemplary receiver 321, if no snow or any other obstruction is located between the emitters 210 and receiver 321, snow sensor 100 may report a first number, indicating that no snow has fallen. The number reported may be, for example, a resistance value that corresponds to the intensity of radiation striking receiver 321. Since the inventor's testing has shown that snow is translucent, not opaque, as snow accumulates on sensor 100, the number reported from exemplary receiver 321 will decrease, and the number will continue to decrease as more and more snow accumulates, but the number will not decrease to zero until radiation from emitters 210 (and any from the sun) is fully blocked from reaching receiver 321.

Depending on the receiver 321 and emitter 210 and other variables discussed below, an initial value reported when there is no obstruction between receiver 321 and emitter 210 may be somewhere between about 5000 and about 15000. As snow begins to fall on sensor 100, the reported value will begin to decrease from this initial value. As a first example, the value may drop by about 200 to about 800 when about 2 to about 4 inches of snow has fallen on sensor 100. As a second example, the value may drop by about 400 to about 1000 after about to about 7 inches of snow has accumulated on sensor 100. Ranges are provided here because these values are dependent on many variables, such as the emitter(s) 210 chosen, the receiver 321 used, the amount of radiation from the sun being detected (if any) along with radiation from emitter(s) 210, whether the sun has gotten more or less obstructed between readings, and the type of snow falling. For instance, the inventor's testing has shown that wet snow (i.e., snow with a relatively higher water content than dry snow) is more translucent than dry snow, so the values reported will drop more slowly as wet snow accumulates on sensor 100 compared with drier snow.

Figure 5:
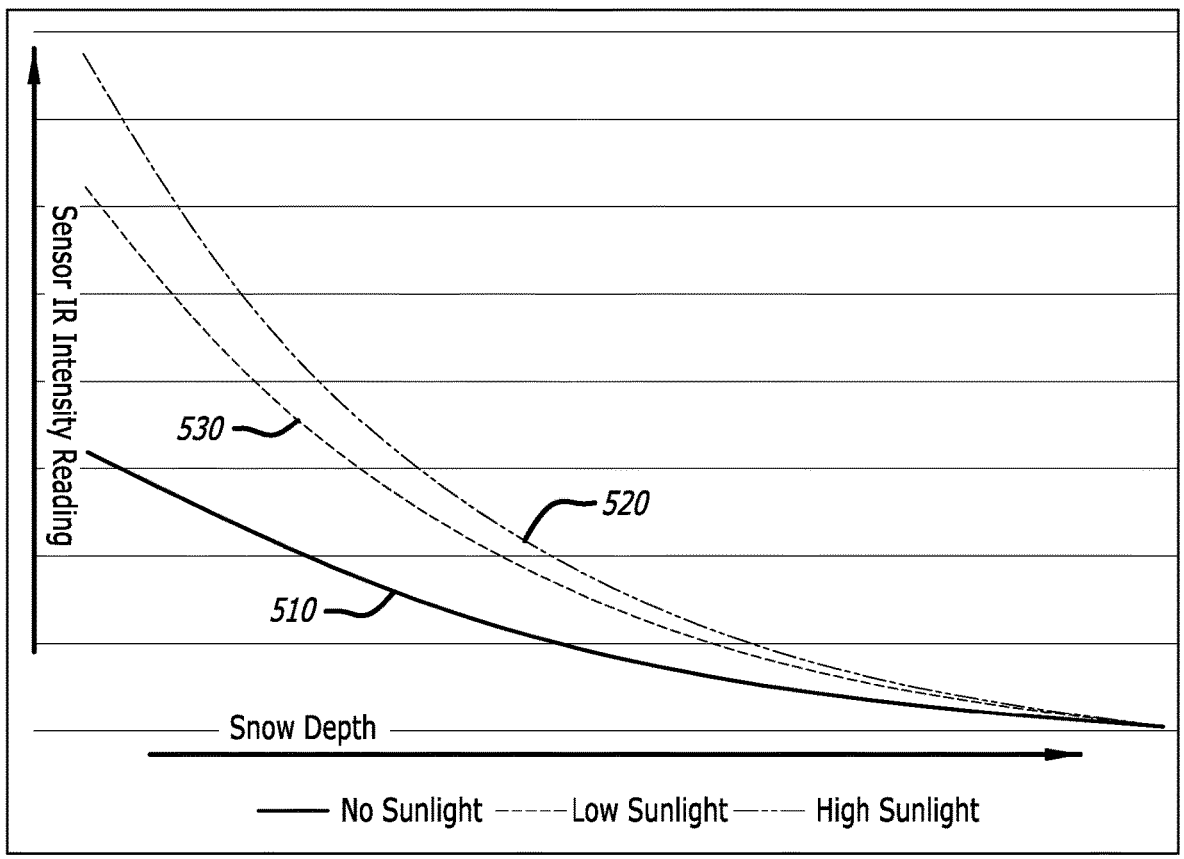
FIG. 5 shows readings from a receiver as a function of snow depth, comparing the curves for readings in bright sunlight, low sunlight, and no sunlight.

As shown in FIG. 5, when there is no sunlight, such as at nighttime (in most locations), the snow sensor reports values that fall along a first curve 510. In bright sunlight, snow sensor 100 reports values that fall along a second curve 520. And in low light, snow sensor 100 reports values that fall along a third curve 530, positioned between curves 510 and 520 in FIG. 5. This depiction shows that when there is no snow, the value reported by snow sensor 100 can vary, as explained above, and in this case, is varying based on the amount of sunlight reaching receiver 321. The values reported in various amounts of sunlight will continue to vary by lesser and lesser amounts as snow accumulates between receiver 321 and emitters 210. Once so much snow has covered optical sensor window 224 that receiver 321 cannot detect any radiation, the curves meet and the value reported under all sunlight conditions is zero.

As an example, snow sensor 100 with Vishay Semiconductor Opto Division's TSOP38238 IC as an exemplary receiver 321 and two superbright 5 mm IR LEDs (as described above) as exemplary emitters 210 were connected to an automated snow removal test system. When there was no snow or other obstruction between emitters 210 and receiver 321, and there was bright sunlight, the inventor found that the initial value reported by receiver 321 was about 6500 (the maximum reading for this receiver chip 321). As snow began to fall, the value reported by receiver 321 decreased quickly, to about 200 when there was about 1.5 inches of snow between emitters 210 and receiver 321. Once about 2 inches to about 2.5 inches of snow accumulated on sensor 100, output from receiver 321 reached zero, since no radiation was reaching receiver 321.

An automated snow removal system attached to the snow sensor 100 from the immediately preceding example might include a controller to automatically activate a snow melting component if the value reported by receiver 321 falls by a certain amount. For instance, the system might activate if the value falls from 6500 to 100. In some embodiments, however, a user may set the sensitivity of the system. For instance, and as shown with line A in FIG. 6A, if a user sets the system to high sensitivity, the system activates snow removal (e.g., turns on the heat tape on a roof) after the value reported from receiver 321 drops a certain amount from the initial value. But if the system is set to a lower sensitivity, as shown with line B in FIG. 6B, the value reported from receiver 321 needs to drop by a larger amount from the initial value before the system activates snow removal.

Figure 6A:
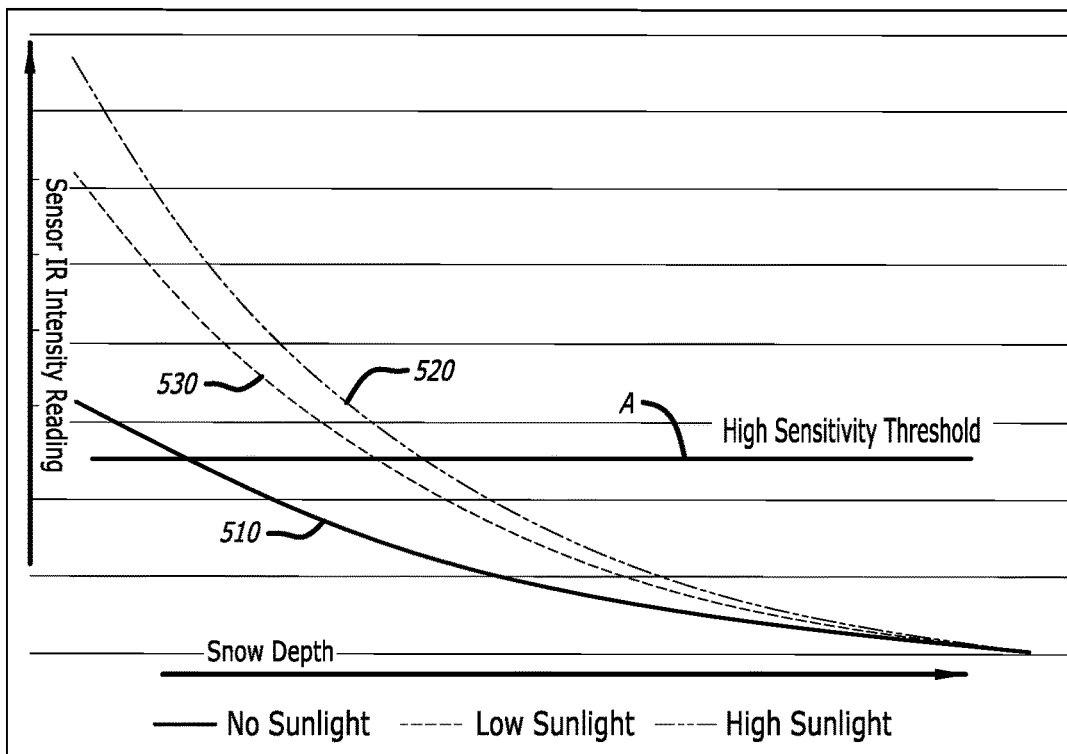
FIG. 6A shows the readings from FIG. 5 with a horizontal line depicting a high sensitivity threshold setting.
Figure 6B:
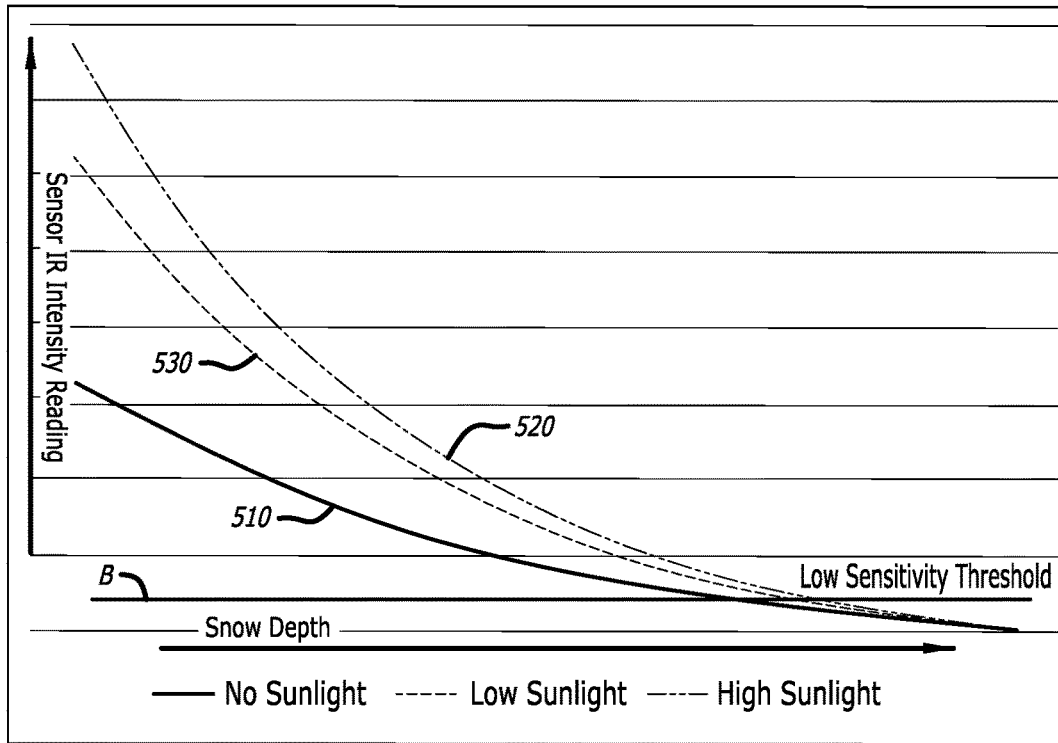
FIG. 6B shows the readings from FIG. 5 with a horizontal line depicting a low sensitivity threshold setting.

This sensitivity setting is a useful feature in many situations. Some users may want to activate the snow removal system as soon as a very small amount of snow is detected, so there is very little chance that any snow or icy conditions exist on the surface being warmed. Other users might choose to let a larger amount of snow accumulate before activating the system, which may save power and therefore money. As another example, if the system is heating a walkway, but the user is not home, that user may allow more snow to accumulate before activating the system, but that same user may want the system to activate immediately if they are at home. Another possibility is the system may be connected to a weather station or weather forecast readout. If very little snow is predicted, and especially if sunlight is predicted to follow the snow, the system may delay a certain amount of time based on that forecast. Even if the system is not connected to a weather station or forecast readout, in a case like this, the user may follow the forecast and change the sensitivity to a low setting so the system is unlikely to turn on, if the user prefers to allow the forecast sunlight to melt the snow. While FIGS. 6A and 6B depict two sensitivity settings, there may be three sensitivity setting (high, medium, low) or more, or the system may be infinitely variable, using a physical or software slider, rheostat, potentiometer or the like to set the sensitivity.

For instance, the automated snow removal test system described earlier was set to high sensitivity. As a result, the system automatically activated a heat tape when the value reported from receiver 321 dropped from 6500 to 200. In other words, when the value reached 200, the system controller automatically activated the heat tape, and the heat tape on the test roof began to melt the snow that had fallen. As snow continued to accumulate on sensor 100, the value reported by receiver 321 also continued to fall, and the system continued to heat the roof and melt the snow. Once the value reported by receiver 321 returned to and exceeded 200, the system controller automatically shut off the heat tape.

In order to replicate or at least closely approximate the amount of snow on the roof or other surface that is heated once the automated snow removal system activates, snow sensor 100 may be placed where heat from the heat tape or other heating element or heat source causes snow on sensor 100 to melt. For instance, the position of snow sensor 100 may be chosen so the snow on sensor 100 is not among the first snow melted by the heat source, and also not among the last snow to be melted. Rather, sensor 100 may be positioned about half the distance between the heat source and where the heat source has the smallest effect.

In this example position, combined with the example above where the snow removal test system is set to high sensitivity, once the system controller activates snow removal (when snow sensor 100 outputs a reading of 200), snow that is close to the heat source begins to melt first— before the snow on sensor 100—and snow on sensor 100 begins to melt before snow that is further from the heat source. If the precipitation rate is greater than the rate of melting at sensor 100, snow will continue to accumulate and the value reported by snow sensor 100 will continue to decline. Once the rate of melting at sensor 100 exceeds the precipitation rate, the value reported by snow sensor 100 will increase. Once receiver 321 detects enough radiation to report a value greater than 200, the controller will automatically shut off the heat source. Again, with the above system configuration, if the sun is bright, this will occur when there is about 1.5 inches of snow.

In yet another example, with the above configuration and placement of snow sensor 100, if it is dark outside, and there is no snow blocking radiation from these exemplary emitters 210, this exemplary receiver 321 reports a value of about 2600. As above, if the system is set to high sensitivity, the snow removal system will automatically activate when the value reported by receiver 321 drops to 200. Testing when there was no ambient light (e.g., at nighttime) found that this occurred when there was about 0.5 to about 1 inch of snow on the sensor. Once about 2 to about 2.5 inches of snow accumulated between emitters 210 and receiver 321, output from snow sensor 100 reached zero, since no radiation was reaching receiver 321. (As can be seen from FIG. 5, the value output by sensor 100 reaches zero for all sunlight conditions at the same snow depth.) As snow continued to accumulate on sensor 100, the value reported by receiver 321 decreased, and the system continued to heat the roof and melt the snow. Once the value reported by receiver 321 returned to and exceeded 200, the snow removal system controller automatically shut off the heat source.

In some embodiments, as in the preceding examples, the system was setup to act according to predetermined instructions. That is, the snow removal system was automated so the heat source switched on when the value reported by receiver 321 reached a certain set value (based on sensitivity chosen). The system controller switched off the heat source when the reading from receiver 321 returned to that same set value. For instance, if set to low sensitivity, the above exemplary configuration of snow sensor 100 would activate snow removal when the reading output from receiver 321 decreased to about 30 or about 25. As described earlier, no matter the sunlight conditions or the sensitivity setting, this configuration of snow sensor 100 reported a value of zero once the snow accumulated between emitters 210 and receiver 321 reached about 2 to about 2.5 inches of snow. When set to low sensitivity, this configuration then turned the snow removal system heat source back off once the reading from receiver 321 increased to about 25 to about 30.

In other embodiments, and as mentioned earlier, the system may have additional sensitivity settings, such as medium sensitivity, medium-low, medium-high, etc. Or the system may have an infinite range of sensitivities, using an electronic slider or potentiometer or the like to set the sensitivity.

In yet other embodiments, the system can be operated manually. For example, a user may monitor the value output by receiver 321 and activate the snow removal system when they desire. In the case described earlier where the system communicates wirelessly with a cloud server over the internet, the user may send commands from their computer, tablet, smart phone or the like. The system controller then switches the heat tape or other snow removal heat source on and off as commanded manually by the user. As mentioned above, the system may instead be stand-alone, either with a private server, or it may be hard-wired together. If hard-wired together, the user would be in physical proximity to manually operate the system.

In any of these embodiments and examples, the system may include a thermometer that reports the temperature in the vicinity of the snow sensor 100, or a thermometer may be built into snow sensor 100. This may be advantageous in instances where receiver 321 reports a decrease in value but the measured temperature is well above freezing. In that case, it may be that a leaf or dust or other obstruction is obscuring the radiation from emitters 210, rather than snow. The user may then check snow sensor 100, or the system may even alert the user to check the snow sensor 100. In other embodiments, the system may be set to operate only below a certain temperature, or only in a certain temperature range. For instance, the system may allow the heat tape to be activated only if the temperature is between 10° Fahrenheit (F) and 35° F. The temperature or temperatures at which the system will be allowed to operate may be predetermined or, in some systems, may be set by the user.

Figure 9:
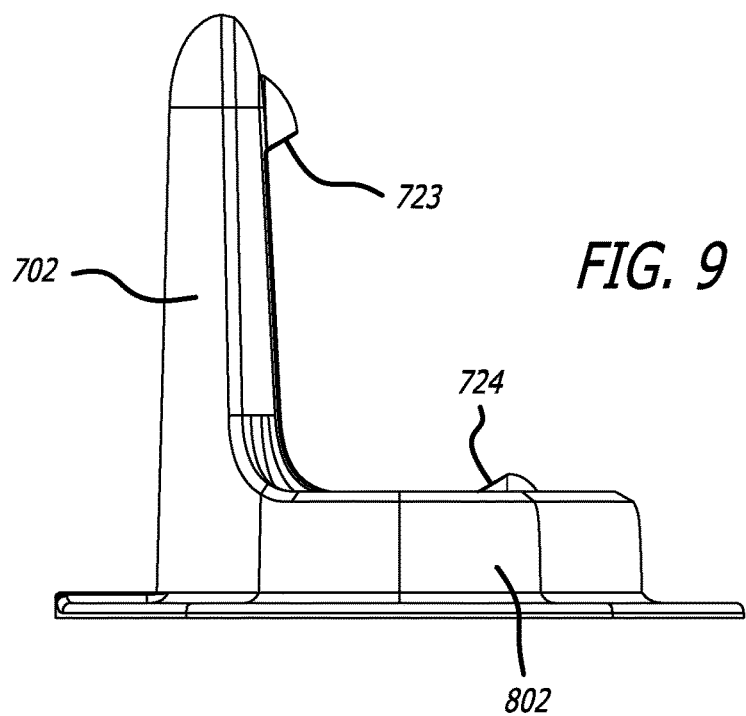
FIG. 9 is a side view of certain components of the snow sensor illustrated in FIGS. 7A-7D.

Another exemplary snow sensing device, generally represented by reference number 600 in FIGS. 7A-7D, includes a housing top 700 and a housing bottom 800. As above, housing top 700 and housing bottom 800 may be made from the same or compatible materials, such as ABS plastic or other weather resistant plastic. Also as above, and as best seen in FIG. 9, snow sensor 600 forms roughly an "L" shape with a housing base portion 802 and a housing post portion 702. In this example, an electronics board 804 is inserted from below into housing bottom 800 and secured with screws 805, but board 804 may be held in place with by any other sufficient means. In addition, snow sensor 600 (or sensor 100) may also include a mounting plate 806 for securing the snow sensor to a roof or other surface. The plate 806 may be held to the snow sensor using a first set of screws (not shown) to attach plate 806 to housing bottom 800 and held to a roof or other surface using screws (not shown) placed in through-holes 807, or via other sufficient attachment means. Those of skill in the art will recognize other techniques and means for securing these snow sensors, such as clips, clamps, bolts, anchors, clecos, cords, adhesives, and the like.

Figure 7A:
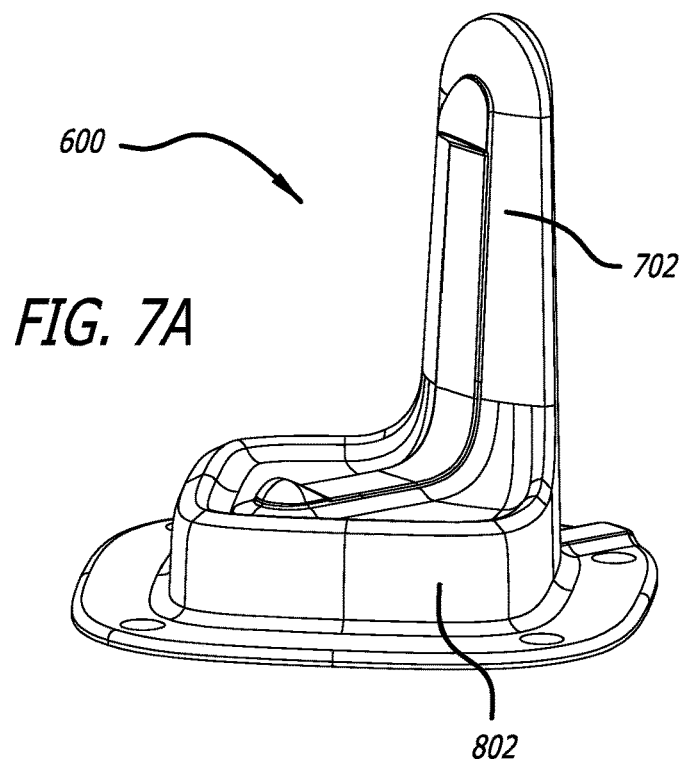
FIG. 7A is a perspective view of another exemplary snow sensor in an assembled state.
Figure 7B:
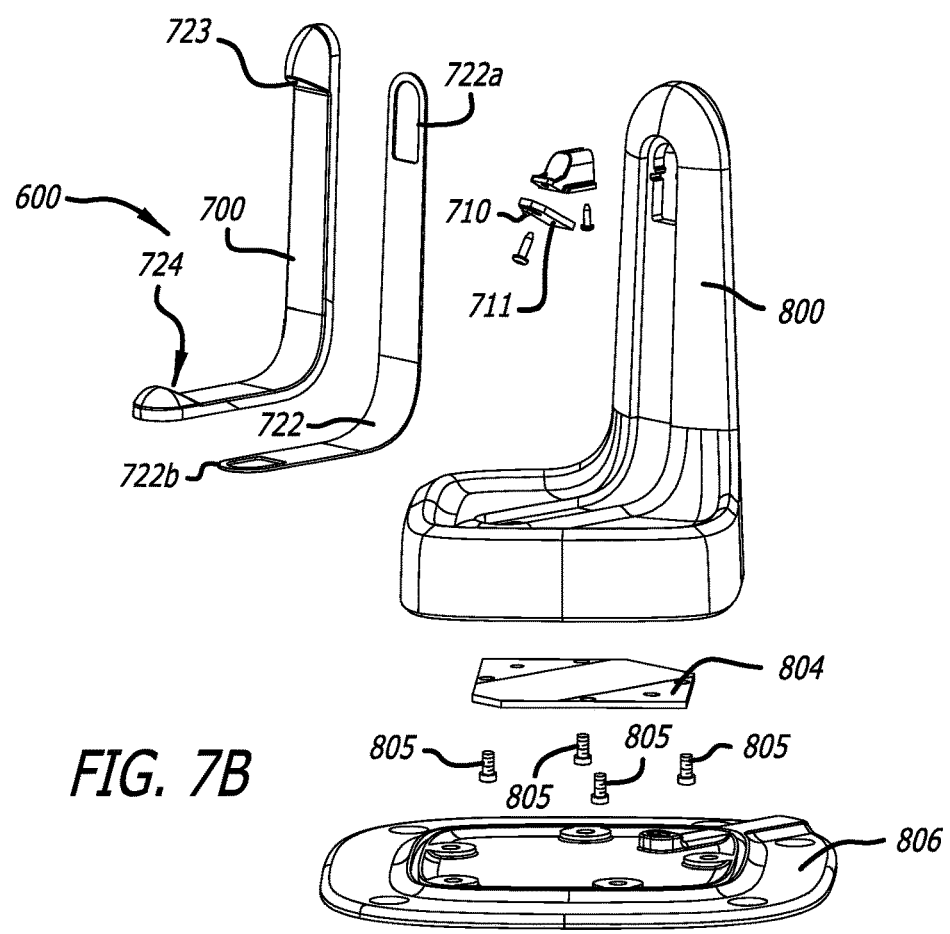
FIG. 7B is an exploded perspective view of certain components of the snow sensor illustrated in FIG. 7A, including a top and bottom of the sensor housing.
Figure 7C:
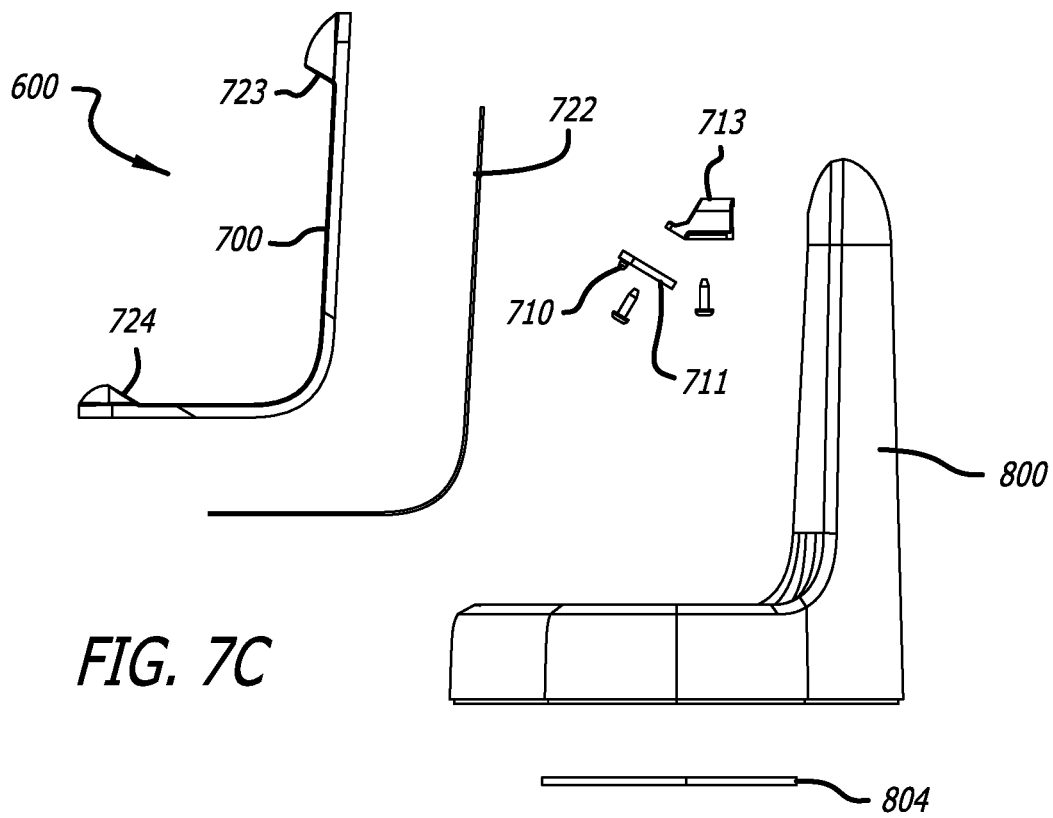
FIG. 7C is an exploded side view of certain components of the snow sensor illustrated in FIG. 7A.

As seen well in FIGS. 7B and 7C, an exemplary housing top 700 and shroud 722 fit into position within housing bottom 800. One or more emitters, such as infrared (IR) emitter 710, is positioned near the top of post portion 702 and in line with a first cut-out area 722a in shroud 722 and an emitter window portion 723 of housing top 700. Housing top 700 may also include an optical sensor window portion 724 that is positioned above a second cut-out area 722b in shroud 722. Depending on the use of snow sensor 600, including the type of radiation being sensed and the environment in which it is used, housing top 700, including window portions 723 and 724, and shroud 722 may be made of a variety of materials. For instance, housing top 700 (or at minimum the portions situated between emitter 710 and receiver 821) may be made of a translucent plastic that is "invisible" to IR and, ideally, resistant to mold, fogging, and condensation. In other alternatives, window portion 723 may not be needed, as window 723 may be integrated into receiver chip 321 or board 320, and window portion 724 may not be needed if window 724 is integrated into emitter (s) 710. Similarly, shroud cut-out areas 722a and 722b may not be needed in some embodiments, or shroud 722 may not be needed at all, if, for instance, shroud 722 is integrated with housing top 700 or housing bottom 800. Exemplary housing bottom 800 may include a housing (not shown) for electronics board 804 or board 804 may be secured in place as described earlier. Electronics board 804 holds receiver chip 821 (not shown) and other electronics described herein and/or others, such as a microcontroller and communications electronics, known in the art.

Figure 8:
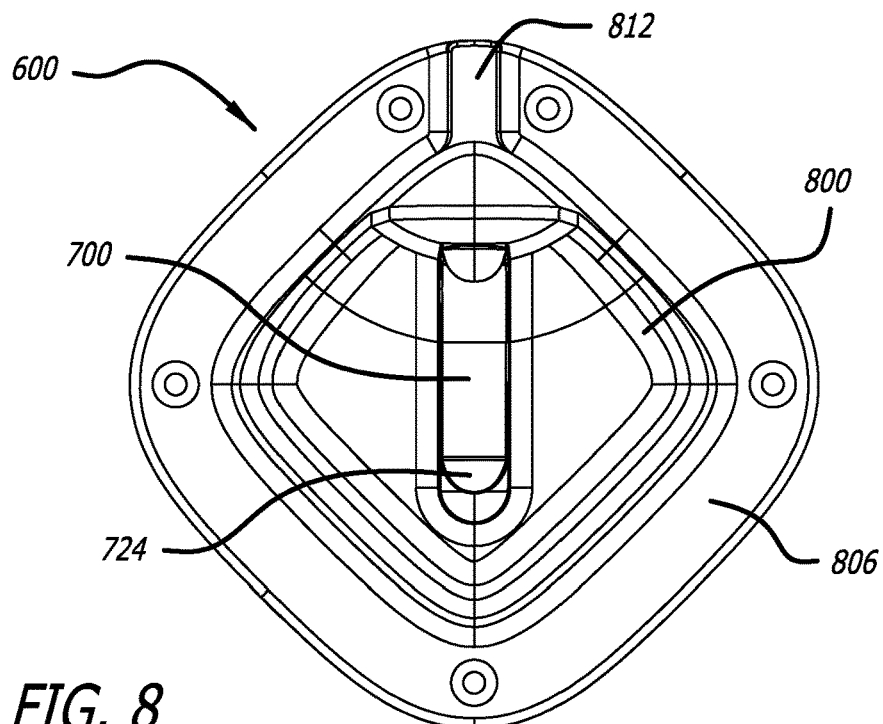
FIG. 8 is a top view of certain components of the snow sensor illustrated in FIGS. 7A through 7D.
Figure 10:
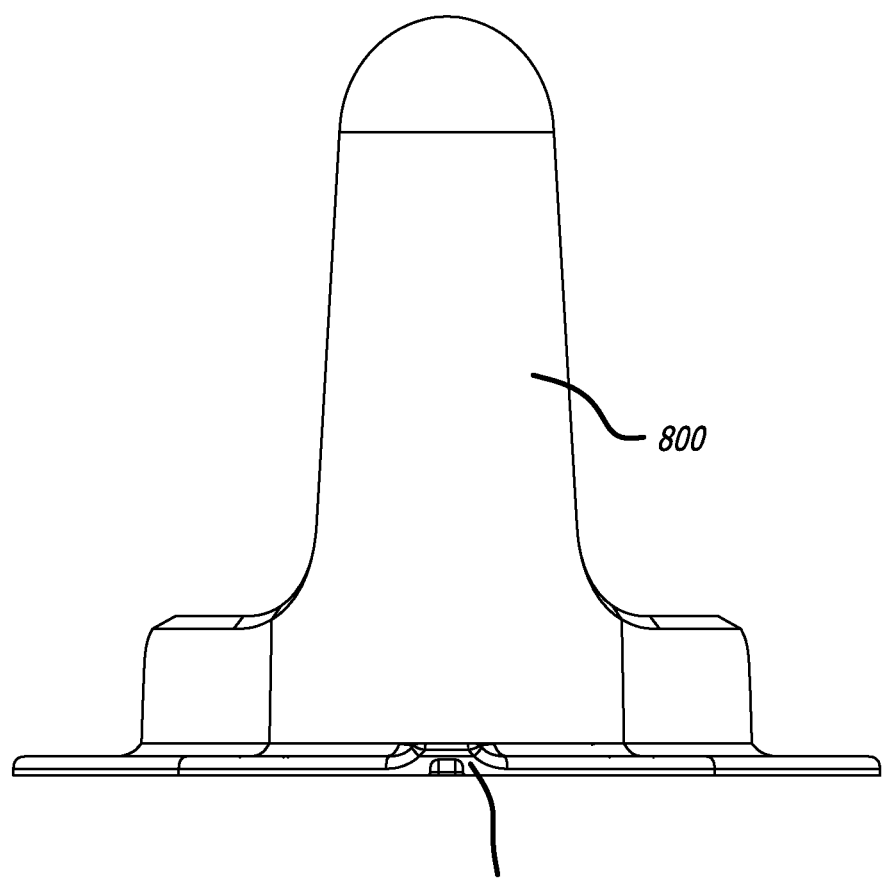
FIG. 10 is a view from the back of the snow sensor illustrated in FIGS. 7A-7D.

As best seen in FIGS. 8 and 10, housing bottom 800 also has an opening 812 for a wire(s) or connector(s) (not shown) to connect snow sensor 600 to power, the internet, a local network, and/or other system components, such as a controller or a communications system. Alternatively and as mentioned above, snow sensor 600 may be powered internally with one or more batteries, such as lithium-ion batteries or alkaline batteries, and may include wireless technology, such as Bluetooth® or WiFi™ components, to communicate wirelessly with a cloud server over the internet or with one or more other system components (not shown), such as one or more switches, a control module (a.k.a. controller), a private server, a power source, etc. In yet other alternatives, one or more of these other system components may be included in the housing for snow sensor 600, such as a switch and controller.

Figure 7D:
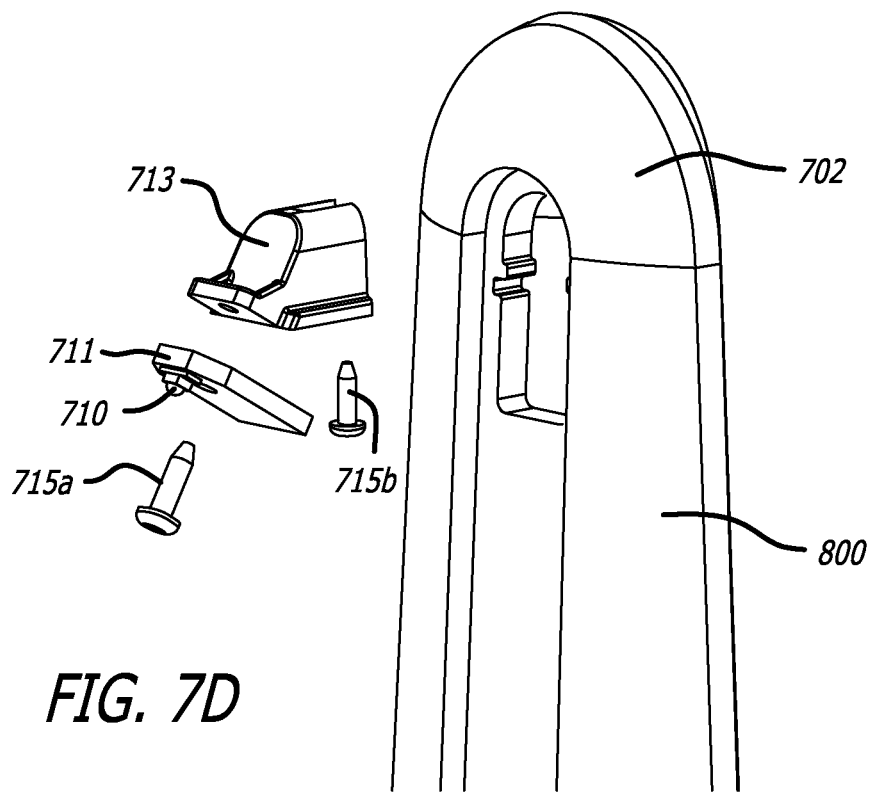
FIG. 7D is a close-up, exploded view of the top of housing post portion 702.

Infrared emitter 710 may comprise one or more IR light emitting diodes (LEDs), such as OSRAM Opto Semiconductors Inc.'s SFH 4059-QS IR emitters commercially available from Digi-Key Electronics, Arrow Electronics or other distributor of electronic components. As best seen in FIG. 7D, which is a close-up, exploded view of the top of housing post portion 702, emitter 710 may be placed on a board 711 that may include other electronic components, such as, for example, resisters and/or other components to monitor emitter 710 to verify it is working and/or to protect emitters 710, e.g., in case of a voltage spike. The board may be secured to a bracket 713 with glue, other adhesive, a screw 715a or other sufficient means. Bracket 713 may be held to housing bottom 800 with glue, other adhesive, a screw 715b or other sufficient means.

As described above, the type and number of IR emitters 710 may vary depending on snow sensor purpose and other components used, particularly receiver chip 821. Receiver chip 821 may be positioned on electronics board 804 with additional electronics as discussed above in relation to optical sensor board 320 and receiver chip 321, such as one or more microcontrollers, switches, resistors, capacitors, communications chip, and the like. Receiver chip 821 may comprise an integrated circuit (IC) with integrated IR proximity detector such as Silicon Laboratories' Si1151-AB00-GM IC commercially available from Digi-Key Electronics, Arrow Electronics or other distributor of electronic components. As noted for above embodiments, additional electronic components to interface with chip 821 will vary based on use and purpose of snow sensor 600, such as microcontroller and wiring to a switch that turns a heat tape on and off, resisters and capacitors to keep the chip 821 stable and protected from voltage spikes, etc., a communications chip for communicating with, e.g., a control module (a.k.a. controller), and/or other components known to those of skill in the art. One or more of these additional electronic components may be separate, stand-alone components enclosed by housing top 700 and housing bottom 800, rather than placed on board 804. And as mentioned earlier, the housing for snow sensor 600 may also house a switch(es) and/or controller.

Use of alternative snow sensor 600 will now be addressed. As above, for some uses of snow sensor 600, it may be most important to know whether or not any snow has fallen. For other uses, it is also or instead more important to know how much snow has fallen, i.e., snow depth. In use, snow sensor 600 may be connected to other devices, as previously described, via wire or wirelessly. For instance, snow sensor 600 may be connected to a device that periodically reports snow depth. This device may receive readings from the sensor and translate those into values of snow depth. As another example, snow sensor 600 may be connected to a snow removal system, such as a system using heat tape or other snow melting component installed on or in the roof of a building, such as a home or hotel or other business, or on or in a walkway or driveway, or on piping. This system may include a controller to interpret readings from the sensor and to act according to predetermined instructions, or it may report the sensed data and wait for instructions in response. If snow sensor 600 is connected to such a snow removal system, it may be more important to know that any snow has or is falling, so the snow removal system may be automatically or manually activated.

Therefore, in some embodiments, snow sensor 600 reports or provides a number that corresponds to the amount of radiation that is sensed by receiver 821—this value varies (drops) as snow falls and accumulates on snow sensor 600 and it also varies (increases) as snow melts and/or is evaporated off of snow sensor 600. For instance, in the example of snow sensor 600 including a first exemplary receiver 821, if no snow or any other obstruction is located between the emitter 710 and receiver 821, snow sensor 600 may report a first number, indicating that no snow has fallen. The number reported may be, for example, a resistance value that corresponds to the intensity of radiation striking receiver 821, to an upper theoretical limit of 65,536, which is 2 to the power of 16. As described above, the inventor's testing has shown that snow is translucent, not opaque, so as snow accumulates on sensor 600, the number reported from exemplary receiver 821 will decrease, and the number will continue to decrease as more and more snow accumulates, but the number will not decrease to a lower theoretical limit of zero until radiation from emitters 710 (and any from the sun) is fully blocked from reaching receiver 821. The inventor has found that a sensitive receiver may never report a value of zero due to the infrared radiation generated by the snow sensor itself, and sensed by the receiver.

Depending on the receiver 821 and emitter 710 and other variables discussed below, an initial value that is reported by the receiver 821 when there is no obstruction between receiver 821 and emitter 710 may be somewhere between about 600 and about 65000. As can be seen well in FIGS. 11A-11C, the initial value is about 600 to about 700 when there is no sunlight and no obstruction between the activated emitter 710 and receiver 821. As seen well in FIGS. 12A-12C, when there is direct sunlight and no significant obstruction between the sunlight and receiver 821, the receiver 821 initial value is about 60,000 to about 65,000, indicating that the receiver 821 is close to its maximum reading described above.

The inventor has determined that more sensitive sensors like sensor 600, when exposed to direct sunlight, provide readings from receiver 821 that change insubstantially or not at all when emitters like emitter 710 are activated versus off. When readings with and without emitter 710 activated are the same or similar, then the sensor is in direct sunlight or high light conditions, the values sensed will be similar to those shown in the curve of FIGS. 12A-12C, and the thresholds may be set at values similar to those shown in FIGS. 12A-12C. In those cases, it may be beneficial, whenever the sensor is checked, to take a reading with emitter 710 activated and a reading with emitter 710 off. Alternatively, if a given set of readings are similar, the emitter may remain off for a time, such as 5 or 10 minutes, before a next comparison of readings with emitter 710 activated and off. This may be preferable in cases where the sensor takes readings often, such as every five seconds or even more frequently, particularly if it is undesirable to activate emitter 710 so frequently, especially if it was recently established that the sensor 600 is in high light conditions.

Figure 11C:
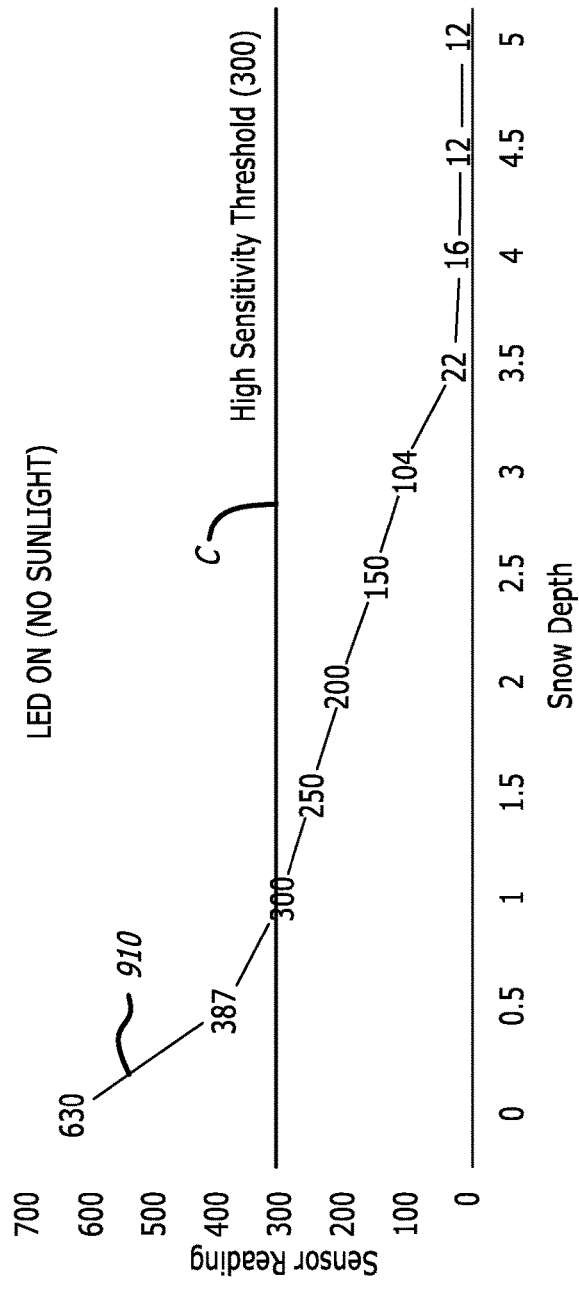
FIG. 11C shows readings, under dark ambient conditions, from a receiver, as a function of snow depth, with a horizontal line depicting an example high-sensitivity threshold for dark conditions.

As snow begins to fall on sensor 600, the reported value begins to decrease from the value reported when there is no obstruction between activated emitter 710 and receiver 821. A first set of examples is depicted in FIGS. 11A-11C, resulting from tests of snow sensor 600 with OSRAM Opto Semiconductors Inc.'s SFH 4059-QS IR emitter as an exemplary emitter 710 and Silicon Laboratories' Si1151-AB00-GM IC as an exemplary receiver 821. As shown in the curve shared by FIGS. 11A-C, when there is no ambient light and emitter 710 is activated, the initial reading of between about 600 and about 700 may drop to between about 350 and about 450 when about half an inch of snow accumulates on sensor 600; may drop to between about 100 and about 200 when about 2.5 to 3 inches accumulate; and may drop to between about 10 and about 20 when about 4 or more inches accumulate on the sensor. In other words, and as shown in FIGS. 11A-11C, in this example of no ambient light, such as would be the case at nighttime (in most locations), snow sensor 600 reports values that fall roughly along a first curve 910.

Figure 12A:
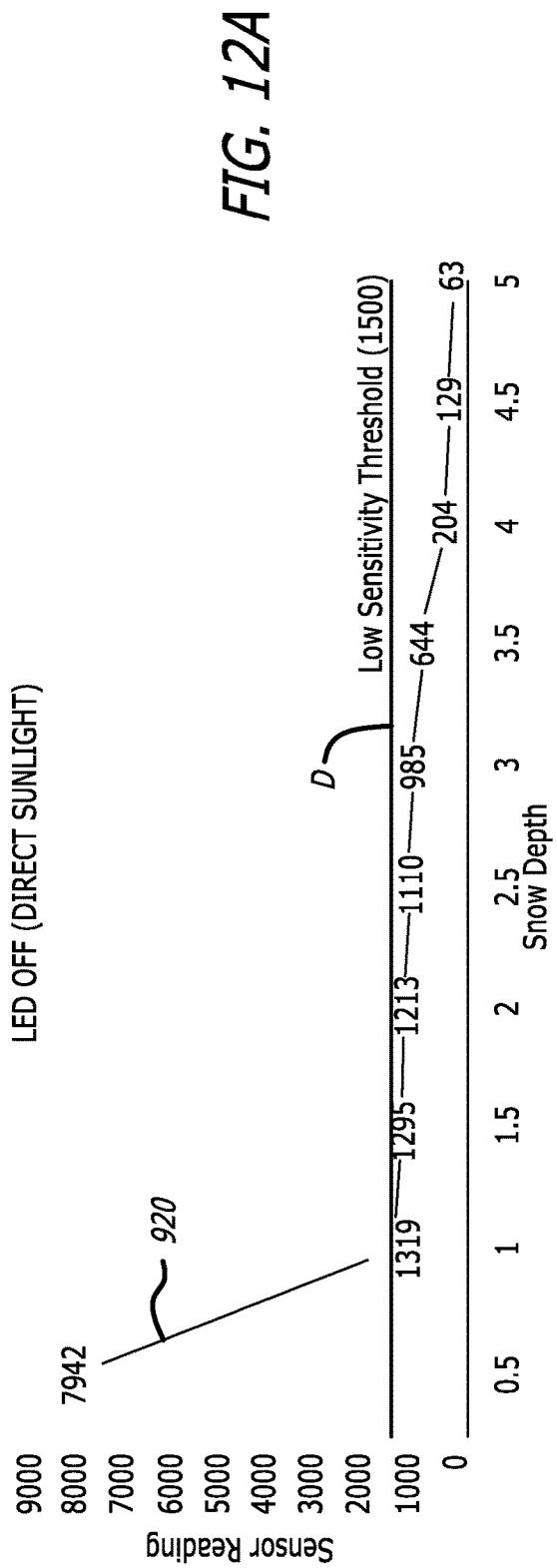
FIG. 12A shows readings, under bright ambient conditions, from a receiver, as a function of snow depth, with a horizontal line depicting an example low-sensitivity threshold for bright conditions.
Figure 12B:
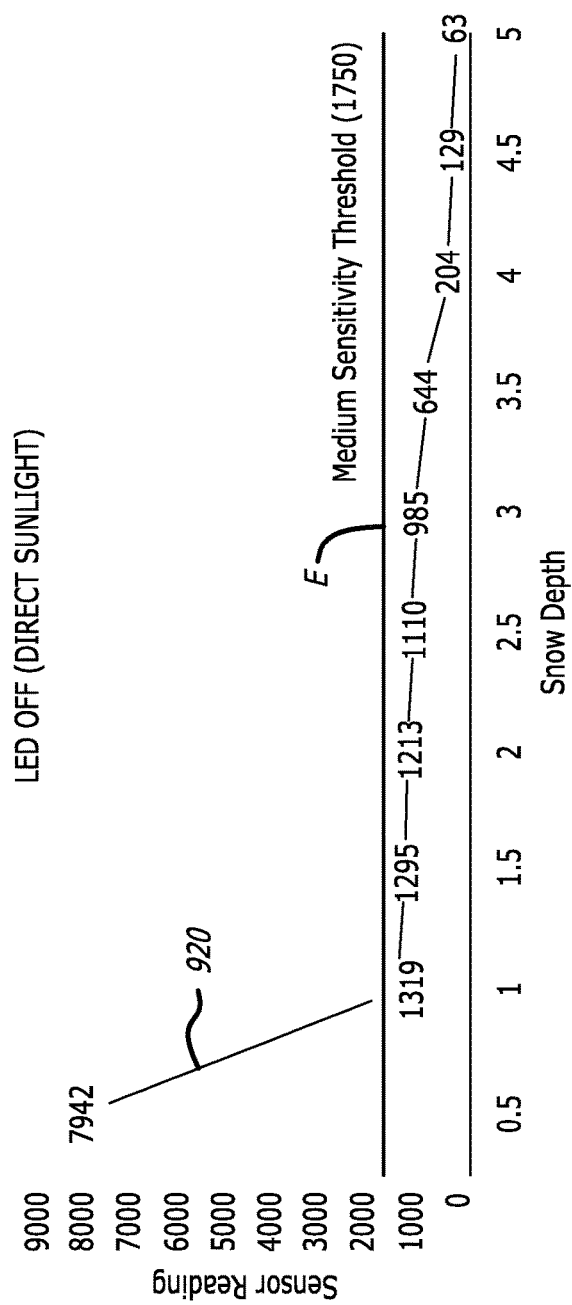
FIG. 12B shows readings, under bright ambient conditions, from a receiver, as a function of snow depth, with a horizontal line depicting an example medium-sensitivity threshold for bright conditions.
Figure 12C:
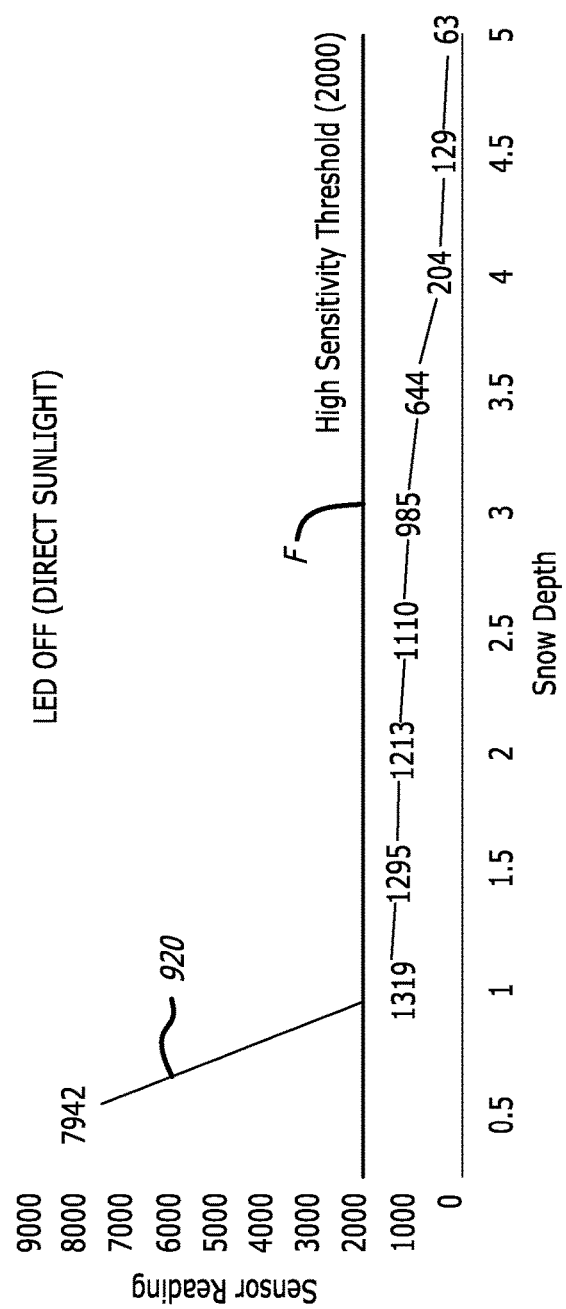
FIG. 12C shows readings, under bright ambient conditions, from a receiver, as a function of snow depth, with a horizontal line depicting an example high-sensitivity threshold for bright conditions.

As a second set of examples, and as depicted in FIGS. 12A-12C, when there is direct sunlight, the value may drop from between about 60,000 and about 65,000 to between about 7000 and about 9000 when about half an inch of snow has fallen on sensor 600; may drop to between about 900 and about 1200 when about 2.5 to 3 inches have fallen; and may drop to between about 50 and about 250 when about 4 or more inches have fallen. In other words, in this example of bright ambient light, snow sensor 600 reports values that fall roughly along a second curve 920, shown in FIGS. 12A-12C. As in earlier examples, ranges are provided because these values are dependent on many variables, such as the emitter(s) chosen, the receiver used, the amount of radiation from the sun being detected (if any) along with radiation from emitter(s), whether the sun has gotten more or less obstructed between readings, and the type of snow falling (e.g., wet versus dry snow, as described above).

Figure 13:
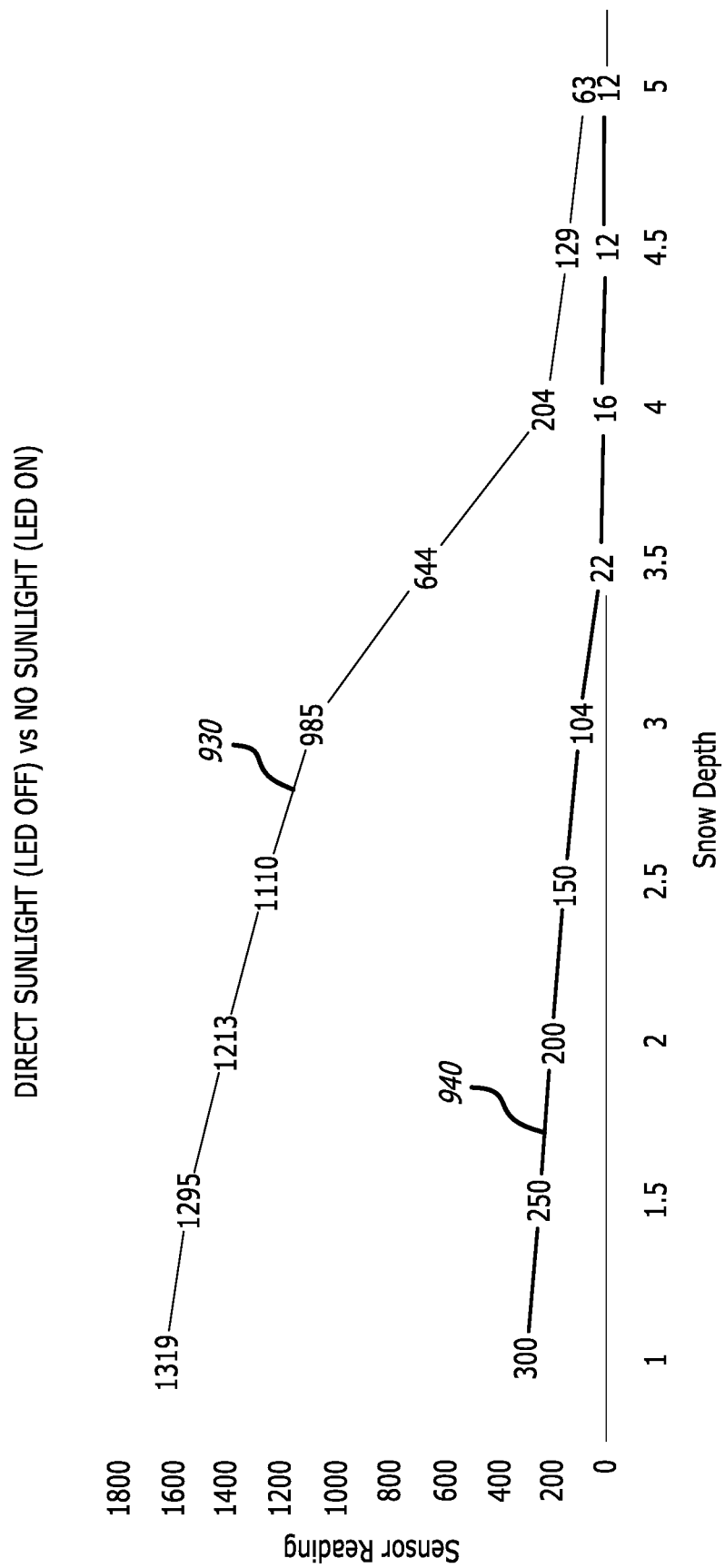
FIG. 13 shows readings from a receiver as a function of snow depths of 1 inch to 5 inches, when the exemplary snow sensor was exposed to bright ambient conditions, compared to when the snow sensor was exposed to dark ambient conditions.

As explained above, when there is no snow, the value reported by snow sensor 600 can vary based on the amount of ambient light reaching receiver 821. As seen in FIG. 13, the values reported in various amounts of ambient light will continue to vary by lesser and lesser amounts as snow accumulates between receiver 821 and emitters 710. In this example, FIG. 13, shows the values reported by receiver 810 for snow levels from one to five inches deep when in direct sunlight on curve 930 and with no ambient light but with emitter 710 activated along curve 940. Theoretically, the curves will meet and the value reported under all sunlight conditions will be zero once so much snow covers optical sensor window 724 that receiver 821 cannot detect any radiation. But as explained earlier, the radiation emitted by more sensitive snow sensors like sensor 600 will be detected by receiver 821, so the readings never reach zero. For some receivers, a value of zero is only reported to indicate a problem with or failure of the receiver.

An automated snow removal system attached to the snow sensor 600 from the immediately preceding example might include a controller to automatically activate a snow melting component if the value reported by receiver 821 falls by, to, or beyond a certain amount. For instance, the system might activate if the value falls from 63,000 to 10,000 when there is sunlight, and might activate if the value falls from 630 to 500 when there is no sunlight. In some embodiments, however, a user may set the sensitivity of the system. For instance, and as shown with line C in FIG. 11C and line F in FIG. 12C, if a user sets the system to high sensitivity, the system activates snow removal (e.g., turns on the heat tape on a roof) after the value reported from receiver 821 drops a certain amount from the initial value. But if the system is set to a lower sensitivity, as shown with lines A and B in FIGS. 11A and 11B, respectively, and lines D and E in FIGS. 12A and 12B, respectively, the value reported from receiver 821 needs to drop by a larger amount from the initial value before the system activates snow removal. The values chosen for high, medium, and low sensitivity may be established in advance, may be customizable with a user interface, may be implemented in firmware that can be updated remotely, or the like. For instance, there may be an advanced user screen that allows a sophisticated user to manually enter values to override those that are supplied in firmware.

As described earlier, this sensitivity setting is a useful feature in many situations since some users may want to activate snow removal as soon as a very small amount of snow is detected (so there is little chance any snow or icy conditions exist on the surface being warmed), while others might choose to let a larger amount of snow accumulate before activating the system (which may save power and therefore money). And as also described earlier, a user may want to activate the system earlier if, for instance, they are home, but later if they are not. As with the earlier sensor examples, the system may be connected to a weather station or weather forecast readout and delay if very little snow is predicted, especially if sunlight is predicted to follow the snow. Or if the system is not connected to a weather station or forecast readout, a user may follow the forecast and lower the sensitivity so the system is unlikely to turn on, if the user prefers to allow the forecast sunlight to melt the snow. While FIGS. 11A-11C and 12A-12C depict three sensitivity settings, there may be more, or the system may be infinitely variable, using a physical or software slider, rheostat, potentiometer or the like to set the sensitivity.

Another feature that may be included in these snow removal systems utilizing these snow sensors is a "quiet" or delay period following either switching on the system or turning the system off, or both. This feature can guard against what is termed "bouncing"—when readings are wavering around a setpoint and would otherwise cause the system to repeatedly turn off and on. For instance, if the system depicted in FIG. 12A is set to low sensitivity and, while in direct sunlight, readings are decreasing and reach 1500, the snow removal system should be activated. If a next reading is taken, e.g., 5, 10, or even 30 seconds later and produces a reading of 1501, it may be better to wait a few minutes, or to verify that the upward trend continues, before quickly deactivating the snow removal system. In the same sense, if the system depicted in FIG. 11C is set to high sensitivity, and it is a dark night, so the emitter(s) are activated, if the snow removal has been activated and causes enough snow to melt that the readings are increasing, if the readings reach or exceed 300, the snow removal system should be set to off. If a next reading finds the value is 299, it may be better to wait a certain time or to check if the readings continue a downward trend before again activating the snow removal system. If, for instance, snow began falling at a faster rate than before, it may be preferable to turn the system back on. But if instead the moon had come out from behind clouds and then gone back behind clouds, it would be better to wait and/or get additional readings before reactivating the snow removal system.

A more sensitive snow sensor, like sensor 600, that produces readings like those in FIGS. 11A-13 (as opposed to a simpler system like sensor 100 that works as described above with reference to FIGS. 5-6B), will be able to determine whether to use the reading with emitter (e.g., one or more LEDs) on or off. Once this determination is made, the system will compare the relevant reading to its sensitivity setting (e.g., the value for high, medium or low) for that light condition. For instance, to determine whether a system set to high sensitivity should use, e.g., 300 or 2000 as its high-sensitivity threshold per FIGS. 11C and 12C, the sensor first takes a reading with emitter 710 and another reading with emitter 710 off. If the readings are the same, or if the reading with emitter 710 on is only slightly higher (e.g., one or just a few points higher) than with emitter 710 off, then the system uses the high-sensitivity threshold for bright sunlight conditions, as shown in FIG. 12C. The reading with emitter 710 off will then be compared to the high-sensitivity threshold for bright conditions, which, in this example, is 2000. If the reading is below 2000, the snow removal component (e.g., heat tape) is activated, and if the reading is above 2000, it is not activated.

For instance, if the reading was 1900, the system automatically activates the heat tape, since the value reported from receiver 821 dropped below 2000, and the heat tape begins to melt the snow that had fallen. As snow continues to accumulate on sensor 600, the value reported by receiver 821 also continues to fall, and the system continues to heat, e.g., a roof, and melt the snow. Once the value reported by receiver 821 returns to and exceeded 2000, the system controller automatically shuts off the heat tape. As described earlier, the positioning of the sensor in relation to heat tape or other snow melting component may be chosen so the snow on sensor 600 is not among the first snow melted by the snow melting component, and also not among the last snow to be melted. Rather, sensor 600 may be positioned about half the distance between the snow melting component and where the snow melting component has the smallest effect.

In another example, if the readings with emitter 701 on and off are very different (e.g., 50 with emitter 710 off and 220 with emitter 710 on), the system uses the sensitivity thresholds for dark conditions, which are shown in FIGS. 11A-11C, and the reading with emitter 710 on. In this scenario, if the system is set to low sensitivity, the system will not activate the snow melting component, because the reading of 220 is above the low-sensitivity threshold of 200. However, if the system is set to medium (or high) sensitivity, the system will activate the snow melting component, because the reading of 220 is below the medium-sensitivity threshold of 250 (and the high-sensitivity threshold of 300), shown in FIG. 11B.

In some embodiments, as in the preceding examples, the system was setup to act according to predetermined instructions. That is, the snow removal system was automated so the snow melting component switched on when the value reported by receiver 821 dropped to a certain set value (based on low, medium, or high sensitivity chosen). The system controller switched off the snow melting component when the reading from receiver 821 increased and returned to that same set value. In other embodiments, and as mentioned earlier, the system may have additional sensitivity settings, such as medium-low, medium-high, etc. Or the system may have an infinite range of sensitivities, using an electronic slider or potentiometer or the like to set the sensitivity.

In yet other embodiments, the system can be operated manually. For example, a user may monitor the value output by receiver 821 and activate the snow removal system when they desire. In the case described earlier where the system communicates wirelessly with a cloud server over the internet, the user may send commands from their computer, tablet, smart phone or the like. The system controller then switches the heat tape or other snow melting component on and off as commanded manually by the user. As mentioned above, the system may instead be stand-alone, either with a private server, or it may be hard-wired together. If hard-wired together, the user would be in physical proximity to manually operate the system.

In any of these embodiments and examples, the system may include a thermometer that reports the temperature in the vicinity of the snow sensor 600, or a thermometer may be built into snow sensor 600. This may be advantageous in instances where receiver 821 reports a decrease in value but the measured temperature is well above freezing. In that case, it may be that a leaf or dust or other obstruction is obscuring the radiation from emitter 710, rather than snow. The user may then check snow sensor 600, or the system may even alert the user to check the snow sensor 600. In other embodiments, the system may be set to operate only below a certain temperature, or only in a certain temperature range. For instance, the system may allow the snow removal component to be activated only if the temperature is between 10° Fahrenheit (F) and 35° F. The temperature or temperatures at which the system will be allowed to operate may be predetermined or, in some systems, may be set by the user.

Various methodologies and systems are presented here in the context of the exemplary structures described in the preceding sections, and illustrated in the figures, for the purpose of explanation only. Although the present methodologies and systems may employ the structures shown in the figures and described above, they are not limited thereto. For instance, while the above snow sensors, systems, and methods have been described and illustrated with respect to certain dimensions, sizes, shapes, arrangements, singular/plural components, materials, and methods, in some embodiments, a sensor, system or method that is otherwise substantially similar in construction and function to any of the above-discussed embodiments may include one or more different dimensions, sizes, shapes, arrangements, plural/singular components, and materials, may be utilized according to different methods. Additionally, embodiments of the present inventions may incorporate any one, combinations of less than all, or all of the methodologies or devices referenced above.

Although the inventions disclosed herein have been described in terms of the preferred embodiments above, numerous modifications and/or additions to the above-described preferred embodiments would be readily apparent to one skilled in the art. By way of example, but not limitation, the present snow sensor assemblies may be incorporated into a weather station. It is intended that the scope of the present inventions extends to all such modifications and/or additions and that the scope of the present inventions is limited solely by the claims set forth below or later added.

Finally, with respect to terminology that may be used herein, whether in the description or the claims, the following should be noted. The terms "comprising," "including," "carrying," "having," "containing," "involving," and the like are open-ended and mean "including but not limited to." Ordinal terms such as "first", "second", "third," do not, in and of themselves, connote any priority, precedence, or order of one element over another or temporal order in which steps of a method are performed. Instead, such terms are merely labels to distinguish one element having a certain name from another element having a same name (but for the ordinal term) to distinguish the elements. "And/or" means that the listed items are alternatives, but the alternatives also include any combination of the listed items. The terms "approximately," "about," "substantially" and "generally" allow for a certain amount of variation from any exact dimensions, measurements, and arrangements, and should be understood within the context of the description and operation of the invention as disclosed herein. Terms such as "top," "bottom," "upper," "lower," "above," and "below" are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, or any other rotational variation therefrom.

What is claimed is:

1. A method, comprising:
sensing snow accumulation by emitting radiation downwardly from at least one IR emitter on a post above an upwardly facing receiver on a base in such a manner that snow accumulated between the at least one IR emitter and the receiver blocks at least some of the radiation from reaching the receiver and the upwardly facing receiver receives radiation that is not blocked by the snow.

2. The method claimed in claim 1, wherein
the at least one IR emitter comprises a plurality of IR emitters.

3. The method claimed in claim 1, wherein
the radiation that is not blocked by the snow comprises radiation from the at least one IR emitter.

4. The method claimed in claim 1, wherein
the radiation that is not blocked by the snow comprises radiation from a combination of the at least one IR emitter and a natural source.

5. The method claimed in claim 4, wherein
the natural source comprises the sun.

6. The method claimed in claim 1, further comprising
reporting at least one numerical value that corresponds to the radiation received by the receiver.

7. The method claimed in claim 6, wherein
the at least one numerical value comprises a plurality of numerical values.

8. The method claimed in claim 6, wherein
the at least one numerical value is reported by the receiver.

9. The method claimed in claim 6, further comprising
sending a command to a snow melting component according to the reported at least one numerical value.

10. The method claimed in claim 9, further comprising
operating the snow melting component according to the command.

* * * * *